April 11, 1939.  E. F. SCHROEDER  2,154,078
METHOD OF TABLING MILL STARCH
Filed Dec. 29, 1937
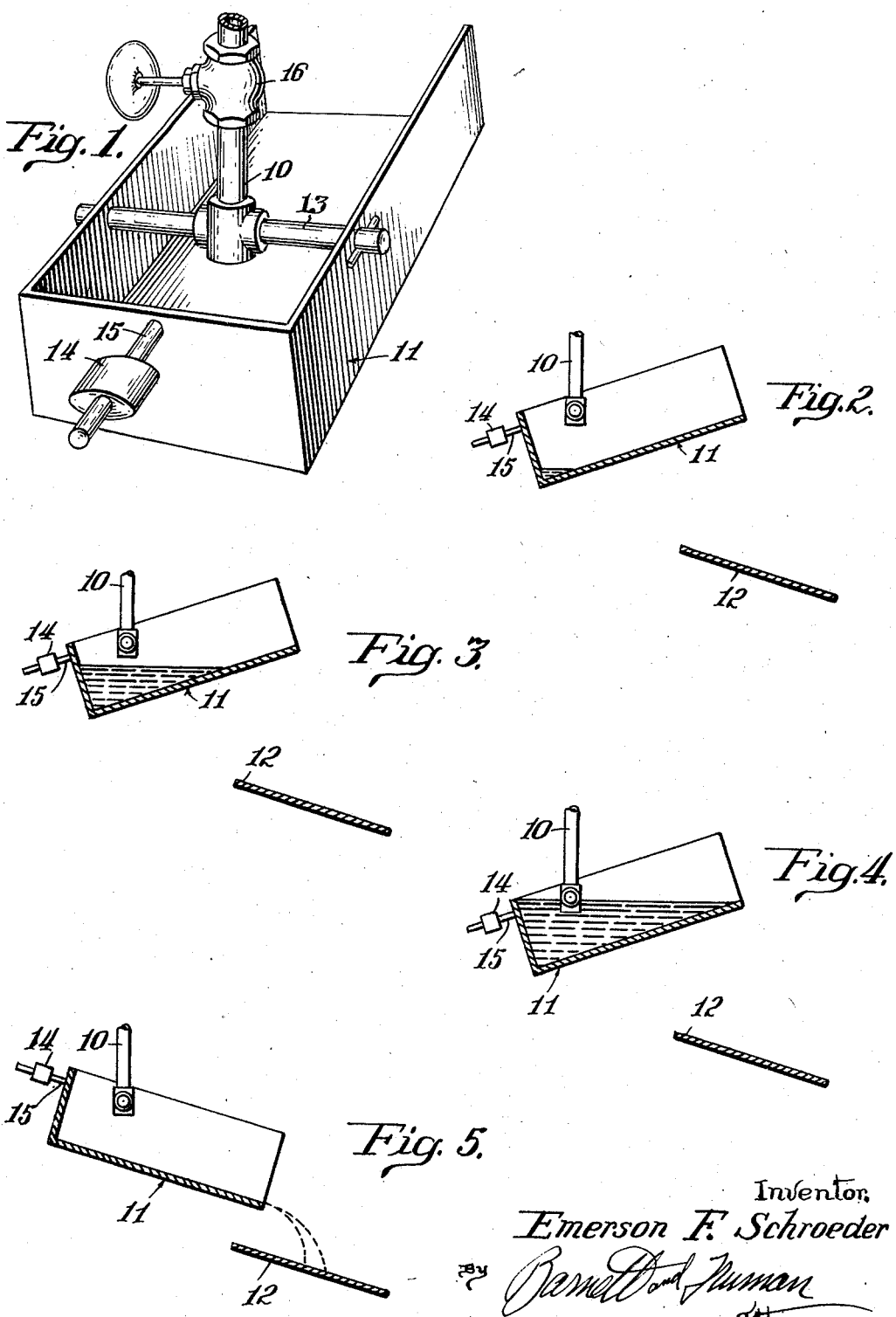
Inventor,
Emerson F. Schroeder Patented Apr. 11, 1939

2,154,078

UNITED STATES PATENT OFFICE 2,154,078

METHOD OF TABLING MILL STARCH

Emerson F. Schroeder, Pekin, Ill., assignor, by mesne assignments, to Corn Products Refining Company, New York, N. Y., a corporation of New Jersey Application December 29, 1937, Serial No. 182,376

3 Claims. (Cl. 127—69)

This invention relates to the manufacture of starch from corn and more particularly to the separation of the starch from the gluten by an operation known as "tabling" in which the mixture of starch, gluten and water, referred to as mill starch or starch milk (derived from the operations in which the germs, hulls and fiber are separated from the comminuted corn) is caused to flow through long, narrow and shallow inclined troughs called tables, upon which the starch is deposited and from the lower ends of which the gluten and the bulk of the water in the mill starch overflows or "tails off" into tanks.

According to the heretofore customary method of tabling, the mill starch is introduced onto the tables in relatively small streams under substantially no pressure, whereby the mill starch flows down the length of the table by gravity alone. It has been found that under such conditions the starch does not settle out smoothly and uniformly to provide a perfect wedge but, to the contrary, there is a tendency for the upper surface of the wedge to form pockets or channels which trap some of the gluten with the result that the settled starch, when removed from the tables, is contaminated with gluten. Likewise some of the starch will not settle out but will tail off with the gluten. In brief, the ordinary tabling methods do not, as a general rule, effect a clean break between starch and gluten.

The present invention provides an improvement upon the heretofore customary method of tabling the mill starch, which improvement involves delivering the mill starch to the table heads in intermittent charges of substantial volume whereby the mill starch flows over the head portion of the table in gentle waves instead of in steady, relatively small streams. It has been found that this change in tabling practice will provide a starch wedge which will have a relatively smooth surface, comparatively free from pockets or channels, thus providing a cleaner break between starch and gluten.

The principal object of the invention is to provide improved means for tabling mill starch to obtain cleaner separation of gluten and starch, with less gluten in the starch and less starch in the gluten.

Another object is to provide a convenient and economical apparatus for obtaining an improved separation of starch and gluten by the tabling process.

A further object is to provide an apparatus for feeding mill starch to a starch table, which apparatus, after preliminary adjustment, functions automatically.

A further object is to provide an intermittent feed for starch tables which is self operating and does not require, for its operation, any outside motive force, such as electricity, steam or the like, but is controlled and operated solely by force of gravity.

Further objects and advantages will more fully appear from the following detailed description with reference to the accompanying drawing, wherein Fig. 1 is a perspective of an intermittent feed bucket.

Figs. 2 to 5 inclusive are sketches illustrating the various stages of operation of the feed bucket illustrated in Fig. 1.

Referring to the drawing, reference character 10 designates a mill starch supply pipe, 11 an intermittent feed bucket and 12 a starch table. The feed bucket 11 is preferably rectangular in shape, about eight inches wide, four inches deep, twelve inches long and open at the top and at one end, although the dimensions of the bucket may be varied considerably without departing from the scope of the present invention. The bucket is pivoted at its sides at a point off the center of gravity toward the closed end to arms 13 extending horizontally from the mill starch supply pipe 10. The closed end of the bucket 11 is provided with a counterbalance 14 which is preferably threaded or otherwise adjustably secured to an arm 15 projecting outwardly from the closed end of the bucket 11.

The bucket 11 is preferably constructed and mounted in such manner that the counterbalance 14 will, when in a position of mean adjustment, tilt the bucket, when empty, to a position of maximum capacity, as illustrated in Figs. 2, 3 and 4, but will be slightly overbalanced when the bucket is filled to capacity whereby the bucket will shift into an emptying position, as indicated in Fig. 5. Finer adjustments may, of course, be effected by moving the counterbalance 14 along the arm 15.

In operating according to the present invention, the capacity of the bucket, the size of the table, the rate of flow to the bucket and the frequency of feed to the table may all be varied within certain limits as desired, with due regard for the particular density of the mill starch delivered to the table head which will vary in different factories. It will be understood, therefore, that the operating details set forth in the following description of the operation of the process are merely illustrative and not by way of limitation.

It has been found that very satisfactory results may be obtained with mill starts of approximately 10.5° to 12° Baumé by adjusting the rate of speed to the bucket so that the bucket will deliver two quarts each fifteen seconds to a table 27 inches wide and 120 feet long and having a pitch of approximately 5 inches. The adjustment of the rate of feed to the bucket may be made by any suitable means and, for the purpose of illustration, is indicated in the drawing as a valve 16 in the mill starch feed pipe 10.

The operation of the bucket is diagrammatically illustrated in Figs. 2 to 5 inclusive, showing the progressive stages of operation. Fig. 2 shows the position of the bucket when empty. Fig. 3 shows the bucket approximately one-half full which, according to a preferred method of operation, will be approximately 7 seconds after the bucket starts to fill. Fig. 4 shows the bucket when it is substantially full or, according to the preferred method referred to, about 14 seconds after the bucket has started to fill. Fig. 5 shows the bucket in a discharging position. In other words, the contents of the bucket has overbalanced the effect of the counterbalance 14. As soon as the mill starch in the bucket is discharged onto the table the bucket will resume the position shown in Fig. 2, responsive to the weight of the counterbalance 14, and the above described operation is repeated.

It will be noted that each charge of mill starch will be delivered to the table not as a steady stream but rather as a wave. The velocity of this wave may be varied by adjusting the distance between the bucket and the table or by controlling the amount of each charge through adjustment of the counterbalance 14, or both. Preferably the adjustment is such that the velocity of each wave is sufficient only to carry approximately one-third of the length of the table. It has been found that a wave of this velocity will not interfere with the settling of the starch but will have sufficient force to lift out any gluten trapped in the deposited starch wedge and also to level off the starch. As the operation proceeds the successive charges of uniform velocity will maintain and build up a starch wedge having a smooth upper surface with the result that no pockets or channels will be formed, thus preventing gluten from being trapped. Of course the size and velocity of the feed wave should be such that the velocity of flow down the lower end of the table, preferably the lower two-thirds, will be no greater than that occasioned by the normal pitch of the table.

In effect, the periodic waves of mill starch serve to both remove any trapped gluten and also to smooth out the deposited starch to prevent further trapping of gluten, with the result that as compared with ordinary tabling operations, there will be considerably less protein in the starch deposited on the table and considerably more protein in the gluten tailing off from the table.

The invention may be readily adapted for use in connection with starch tables of various size and pitch and for tabling of mill starch at varied densities, which may range as high as 15° Baumé or even higher.

It is intended to cover all variations and modifications within the scope of the appended claims.

I claim:

1. In the method of tabling mill starch, the improvement which consists in passing mill starch over the upper end of the table in intermittent charges at a velocity substantially in excess of the normal velocity produced by the pitch of the table.

2. In the method of tabling mill starch, the improvement which consists in delivering mill starch to the table head in intermittent charges at a velocity and in an amount such that each charge will flow as a wave approximately one-third of the length of the table and thereafter assume a normal gravity flow.

3. In the method of tabling starch, the improvement which consists in delivering the mill starch to the table head in intermittent charges at a velocity and rate and in an amount substantially corresponding to two quarts of 10.5° to 12° Baumé mill starch every fifteen seconds to form a wave extending approximately 40 feet on a starch table 120 feet long, 27 inches wide and having a pitch of five inches.

EMERSON F. SCHROEDER.